UNITED STATES PATENT OFFICE.

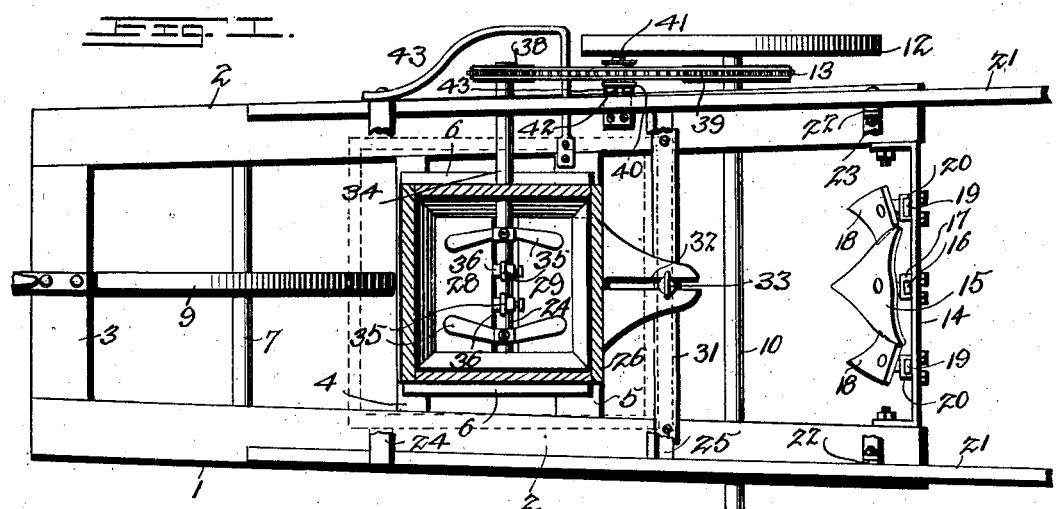

ELIAS LAFAYETTE BRAXTON, OF PACTOLUS, NORTH CAROLINA.

FERTILIZER-DISTRIBUTER.

SPECIFICATION forming part of Letters Patent No. 708,118, dated September 2, 1902.

Application filed November 26, 1901. Serial No. 83,758. (No model.)

*To all whom it may concern:*

Be it known that I, ELIAS LAFAYETTE BRAXTON, a citizen of the United States, residing at Pactolus, in the county of Lafayette and State of North Carolina, have invented a new and useful Fertilizer-Distributer, of which the following is a specification.

My invention is an improved fertilizer-distributer adapted for depositing fertilizer in furrows in such quantities as may be desired; and it consists in the peculiar construction and combination of devices hereinafter fully set forth and claimed.

In the accompanying drawings, Figure 1 is partly a top plan view and partly a horizontal section taken on a plane indicated by the line *a a* of Fig. 2. Fig. 2 is a vertical longitudinal sectional view of my improved fertilizer-distributer. Fig. 3 is a detail sectional view showing a modification.

In the embodiment of my invention I provide a frame 1, which comprises a pair of side bars 2, a front connecting-bar 3, a pair of cross-bars 4 5, which connect the side bars 2 together and are disposed at points near the centers of the said side bars, and a pair of longitudinally-disposed bars 6, which connect said bars 4 5 together. A shaft 7 is disposed transversely of the frame 1, at a suitable distance from the front end thereof, and is journaled in suitable bearings 8, one of which is indicated in dotted lines in Fig. 2. On the central portion of the said shaft 7 is a front supporting-wheel 9. A shaft 10 is disposed transversely of the frame, near the rear end thereof, and is journaled in suitable bearings 11, which are secured to the under sides of the bars 2. On the said shaft are a pair of supporting and traction wheels 12, which are disposed at opposite sides of the frame 1. A sprocket-wheel 13 is also secured on said shaft 10 and is disposed on one side of said frame 1. A metallic transversely-disposed bar 14 connects the rear ends of the side bars 2 and is here shown as bolted thereto. A centrally-disposed stirring shovel or point 15 has its standard 16 secured on the front side of the bar 14, at the center thereof, by a clip-bolt 17. Hence the said stirring shovel or point may be vertically adjusted and caused to operate in the bottom of a furrow at any desired depth in the soil. On opposite sides of the stirring point or shovel 15 are covering points or shovels 18, which also operate in the furrow, at the sides thereof, and the standards 19 of which are secured to the cross-bar 14 by clip-bolts 20. Said covering-points are also vertically adjustable. A pair of handles 21 have their front ends secured to the side bars 2 at a suitable distance from the front end of the frame 1. A pair of braces 22, which are preferably iron bars, have their lower ends secured on the side bars 2, near the rear ends thereof, and their upper ends secured to the inner sides of the handles 21. A cross-bar 23 has its ends disposed between and secured to the upper ends of the braces 22 and also secured to the said handles. A pair of cross-bars 24 25 also connect the handles 21 together and are disposed at suitable distances from the front ends thereof.

The hopper 26 is of downwardly-tapering form. The lower portion of the hopper is disposed in the opening in the frame 1, formed between the cross-bars 4 5 and the longitudinally-disposed bars 6, which connect said cross-bars. The upper portion of the hopper is disposed between the handles 21, and the cross-bars 24 25, which connect the handles, lie, respectively, against the front and rear sides of the upper portion of the hopper and are secured thereto. Thereby the hopper is firmly secured to the frame and is braced by the handles and the said cross-bars 24 25. The lower contracted portion of the hopper forms a discharge-spout 27. In the form of my invention shown in Fig. 2 the hopper is provided with a bottom board 28, with which coacts the cut-off slide-plate 29, which operates in an opening 30 in the rear side of the hopper, is supported by the rear side of the hopper, and is movable toward and from the bottom board 28 to form a discharge-opening of any desired width and to entirely cut off the discharge of fertilizer from the hopper when said cut-off slide-plate is closed against the bottom board 28. The rear portion of the said cut-off slide-plate, which projects rearwardly from the hopper, is supported on a cross-bar 31, which connects the side bars 2. The rear projecting portion of the cut-off slide-plate is provided with a longitudinal slot 32, in which is a clamp-screw which engages a threaded opening in said cross-bar 31.

By means of said clamp-screw the said cut-off slide-plate may be secured at any desired adjustment, and by appropriately adjusting the said cut-off slide-plate the machine may be adjusted to deposit fertilizer in any desired quantities in the furrows.

In Fig. 3 of the drawings I illustrate a modification in which I employ a pair of the cut-off slide-plates 29, which coact to form the bottom of the hopper and to form a discharge-opening of any desired width therein, according to the adjustment of the cut-off slide-plates with relation to each other. In this modified form of my invention the bottom board 28 (shown in Fig. 2) is dispensed with, as will be understood.

A stirring-shaft 34 is disposed transversely of the hopper and has its bearings in the sides thereof. On the said shaft are secured a series of radial stirring-blades 35, which have collars 36, adjustably secured on the shaft 34 by set-screws 37. In action the stirring-blades rotate above the bottom of the hopper, prevent the fertilizer therein from becoming lodged or clogged, and feed the fertilizer to the discharge-opening of the hopper, so that the fertilizer is discharged evenly and continuously from the hopper into a furrow. On one end of the shaft 34 is secured a sprocket-wheel 38, which is disposed in advance of the sprocket-wheel 13 and is connected thereto by an endless sprocket-chain 39. The upper lead of said sprocket-chain passes over a tightening-pulley 40, which revolves on a bolt 41, that is adjustable in a vertical slot 42 of a standard 43, which is secured on and rises from one of the side bars 2. By adjusting said tightening-pulley 30 the sprocket-chain may be kept at the requisite tension to cause power to be conveyed from the shaft 10 to the shaft 34. By varying the sizes of the sprocket-wheels 13 36 the stirring-shaft 34 may be rotated at any desired rate of speed.

On one of the side bars 2 is secured a fender 43, which is below the sprocket-wheel 36, projects laterally outwardly beyond the same, extends in advance thereof, and is disposed in front of the proximate side supporting-wheel 12. The function of this fender is to prevent obstructions from injuring the connections between the shafts 10 34.

A fertilizer-distributer thus constructed is exceedingly strong and durable, may be manufactured at slight cost, and is not likely to get out of order.

I have tested my improved fertilizer-distributer by operating the same practically in the field and find that the same is thoroughly efficient and reliable in operation and may be adjusted in such manner as to distribute fertilizer in any desired quantities.

Having thus described my invention, I claim—

1. In a fertilizer-distributer, the combination of a wheeled frame having cross-bars forming an opening therein, a downwardly-tapered hopper having its lower portion inserted between said cross-bars and bearing against the same, handles attached to the frame and disposed on opposite sides of the hopper, cross-bars connecting said handles and disposed on and bearing against the front and rear sides of the upper portion of the hopper, a cut-off slide-plate operating in an opening in one side of the hopper, extending outwardly therefrom and having a longitudinal slot, a support fixed on the frame for the outer end of said slide, and a clamping-screw in said support and operating in said slot, substantially as described.

2. In a fertilizer-distributer, the combination of a frame, a centrally-disposed supporting-wheel at the front end thereof, a shaft journaled in bearings near the rear end of the frame, supporting-wheels on said shaft on opposite sides of the frame, a sprocket-wheel on said shaft, at one side of the frame, a hopper supported on the frame, a stirring-shaft journaled in the hopper, a sprocket-wheel on the stirring-shaft at one side of the hopper, a sprocket-chain connecting said sprocket-wheels, and a fender on one side of the frame, in advance of one of the side wheels and extending in advance of and laterally beyond the sprocket-wheel on the stirring-shaft, substantially as described.

In testimony that I claim the foregoing as my own I have hereto affixed my signature in the presence of two witnesses.

ELIAS LAFAYETTE BRAXTON.

Witnesses:
J. ROSS COLHOUN,
J. H. JOCHUM, Jr.